(12) United States Patent
Foss et al.

(10) Patent No.: US 9,860,376 B1
(45) Date of Patent: Jan. 2, 2018

(54) CALL SCREENING DEVICE

(71) Applicants: Aaron Foss, Port Jefferson, NY (US); Vadim Alexander Gordin, Louisville, KY (US)

(72) Inventors: Aaron Foss, Port Jefferson, NY (US); Vadim Alexander Gordin, Louisville, KY (US)

( * ) Notice: Subject to any disclaimer, the term of this patent is extended or adjusted under 35 U.S.C. 154(b) by 0 days.

(21) Appl. No.: 14/996,734

(22) Filed: Jan. 15, 2016

(51) Int. Cl.
*H04M 1/56* (2006.01)
*H04M 15/06* (2006.01)
*H04M 3/42* (2006.01)
*H04M 3/436* (2006.01)

(52) U.S. Cl.
CPC .................. *H04M 3/436* (2013.01)

(58) Field of Classification Search
None
See application file for complete search history.

(56) References Cited

U.S. PATENT DOCUMENTS

| | | |
|---|---|---|
| 4,278,844 A | 7/1981 | Jones |
| 5,408,525 A | 4/1995 | Eldering |
| 5,651,053 A | 7/1997 | Mitchell |
| 5,655,013 A | 8/1997 | Gainsboro |
| 5,724,408 A * | 3/1998 | Morganstein ......... H04M 3/436 379/142.04 |
| 5,828,742 A | 10/1998 | Khalid |
| 5,995,603 A * | 11/1999 | Anderson ............. H04M 1/663 379/142.04 |
| 5,999,606 A | 12/1999 | Weishut |
| 6,130,937 A | 10/2000 | Fotta |
| 6,134,320 A * | 10/2000 | Swan .................... H04M 1/247 379/142.01 |
| 6,289,084 B1 * | 9/2001 | Bushnell ............. H04M 1/2745 379/192 |
| 6,295,341 B1 * | 9/2001 | Muller ................ H04M 1/6505 379/88.12 |
| 6,400,814 B1 * | 6/2002 | Adams .................. H04M 1/663 379/142.01 |
| 6,549,619 B1 | 4/2003 | Bell |
| 6,700,957 B2 * | 3/2004 | Horne ................... H04M 1/663 379/142.06 |
| 6,859,528 B1 | 2/2005 | Welte |
| 6,990,187 B2 | 1/2006 | MacNamara |
| 7,103,167 B2 | 9/2006 | Brahm |
| 7,233,656 B2 | 6/2007 | Bedingfield |
| 7,295,660 B1 | 11/2007 | Higginbotham |
| 7,715,790 B1 | 5/2010 | Kennedy |
| 7,756,262 B2 | 7/2010 | Caspi |
| 8,346,881 B1 | 1/2013 | Cohen |
| 2004/0131164 A1 * | 7/2004 | Gould ................... H04M 1/647 379/88.19 |
| 2010/0158233 A1 * | 6/2010 | Caceres ............... H04M 3/436 379/207.02 |

* cited by examiner

*Primary Examiner* — Quoc D Tran

(57) ABSTRACT

Devices and methods are disclosed herein which allow a telephone call screening device to be connected in parallel to the remaining extensions within a home.

16 Claims, 3 Drawing Sheets

Telephone Network within the home

CALL SCREENING DEVICE

BACKGROUND/FIELD

A shortcoming of existing telephone call screening circuits is the question of how to induce parallel handsets to ring after a call has been successfully screened. As shown in FIG. 2, current call screening devices which induce all of the phones in a home to ring must be connected in-line between the publically switched telephone network (PSTN) and the local phone network within than home. Novel solutions are described herein which enable a call screening device to be connected to any telephone extension within a home as shown in FIG. 2 while still being able to induce ringing at all of the other handsets connected to parallel extensions.

SUMMARY

According to a first embodiment of the present disclosure, a call screening device for telephone systems includes; telephone line input and call handling electronics and a screening criteria stored within the electronics, wherein upon receiving an incoming call via the telephone line, the call screening device picks up the line to answer the call, executes the screening criteria upon the call; if the criteria returns a "pass", the electronics issues a hook flash command to the telephone line and then hangs up the line, thereby causing the line and all extensions connected to it to ring again.

According to further embodiments of the present disclosure, the screening criteria is a reverse Turing test.

According to further embodiments of the present disclosure, the screening criteria selects a random number that is read to the caller which the caller must then correctly enter as DTMF tones.

According to further embodiments of the present disclosure, the screening criteria is a question which is irrelevant but effortless to answer for a human caller, including for instance, "what year is it?", "what vegetables are in a tomato soup?", "how many arms does a person have?" or other reverse Turing test known in the computational arts.

According to further embodiments of the present disclosure, after a "fail" result, the caller is played a recorded message before the device hangs up the line.

According to further embodiments of the present disclosure, after a "fail" result, the caller is given the option of recording a message for the called party before the device hangs up the line.

According to further embodiments of the present disclosure, after a "fail" result, the electronics hangs up the line, thereby disconnecting the call.

According to further embodiments of the present disclosure, the screening criteria is a blacklist.

According to certain embodiments of the present disclosure, a call screening method for telephone systems implemented on an electronic device includes the steps of; providing telephone line input and call handling electronics and a screening criteria stored within the electronics, wherein upon receiving an incoming call via the telephone line, the call screening electronics picks up the line to answer the call, executes the screening criteria upon the call; if the criteria returns a "pass", the electronics issues a hook flash command to the telephone line and then hangs up the line, thereby causing the line and all extensions connected to it to ring again.

According to further embodiments of the presently disclosed method, the screening criteria is a reverse Turing test.

According to further embodiments of the presently disclosed method, the screening criteria selects a random number that is read to the caller which the caller must then correctly enter as DTMF tones.

According to further embodiments of the presently disclosed method, the screening criteria is a question which is irrelevant but effortless to answer for a human caller, including for instance, "what year is it?", "what vegetables are in a tomato soup?", "how many arms does a person have?" or other reverse Turing test known in the computational arts.

According to further embodiments of the presently disclosed method, after a "fail" result, the caller is played a recorded message before the device hangs up the line.

According to further embodiments of the presently disclosed method, after a "fail" result, the caller is given the option of recording a message for the called party before the device hangs up the line.

According to further embodiments of the presently disclosed method, after a "fail" result, the electronics hangs up the line, thereby disconnecting the call.

According to further embodiments of the presently disclosed method, the screening criteria is a blacklist.

BRIEF DESCRIPTION OF THE FIGURES

In the figures, which are not necessarily drawn to scale, like numerals describe substantially similar components throughout the several views. The drawings illustrate generally, by way of example, but not by way of limitation, various embodiments discussed in the claims of the present document.

DETAILED DESCRIPTION OF THE FIGURES

Figure 1:
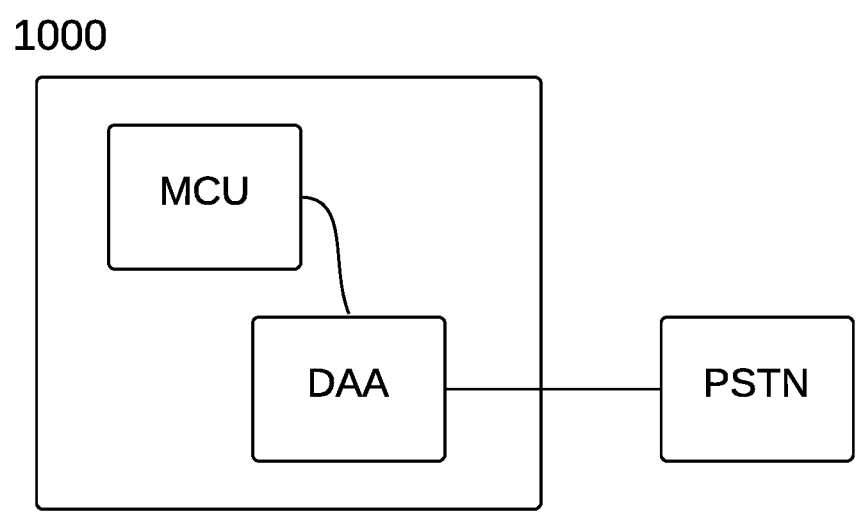
FIG. 1 shows a block diagram of Call Screening device 1000.
Figure 2:
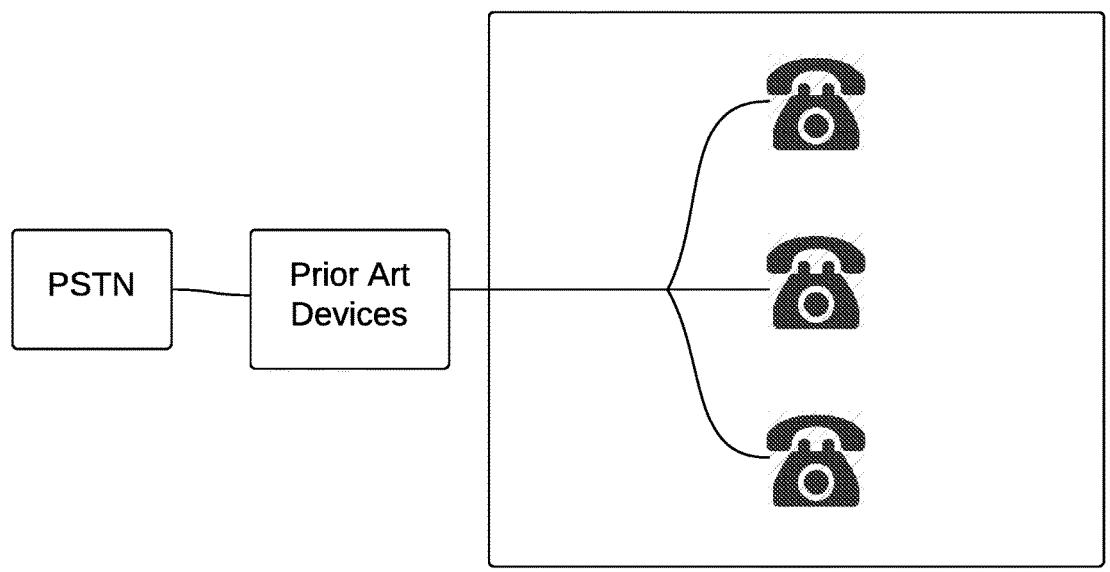
FIG. 2 shows a connection diagram of prior art devices.

Various embodiments of the presently disclosed apparatus and method will now be described in detail with reference to the drawings, wherein like reference numerals identify similar or identical elements.

As part of the standard implementation of Call Waiting and 3-Way calling features, PSTN devices outside of a user's home are configured to issue a ring command to a telephone network within the home if a user hangs up their telephone line with a caller still connected to a secondary line in a Call Waiting arrangement or 3-way calling arrangement. In accepted usage, this feature works as follows: while a user is having a telephone conversation with a first caller, a second caller wishes to connect. The user can issue a hook-flash command to the PSTN via their handset to be connected to the second caller and place the first caller on hold. If the user then mistakenly hangs up the line with the first caller still on hold, the PSTN is configured to correct that error by ringing all of the phone extensions at the user's location such that when the user picks up the line, he is reconnected to the first caller.

The present invention utilizes this error-correcting behavior of the PTSN in a manner other than that for which it was originally intended using an action sequence [a hook flash followed by hanging up the line] which tricks the PSTN equipment into ringing all of the extensions within a home on command from a device connected to any extension without the need for a discrete ring generator. Hereinafter, this sequence [hook flash followed by hanging up the line] shall be referred to as the Ring Back Command.

Figure 3:
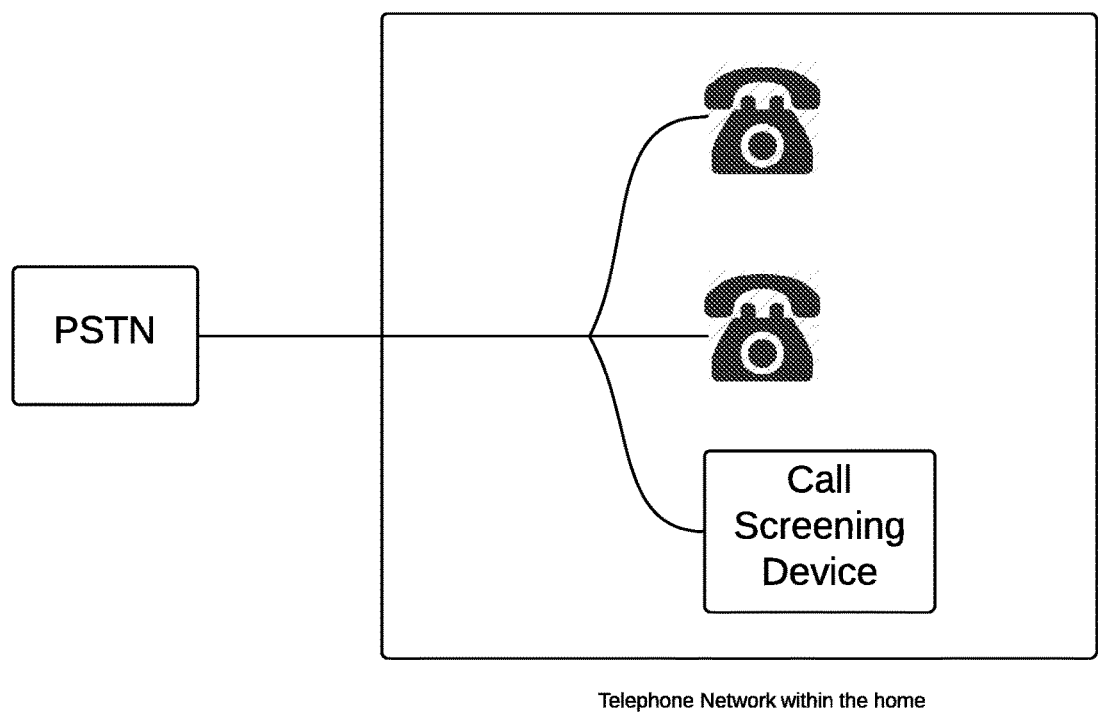
FIG. 3 shows a connection diagram of a call screening device 1000.

According to a first embodiment of the present disclosure shown in the block diagram labelled FIG. 1, a Call Screening Device woo includes a microcontroller unit having memory and the capability to execute digital signal processing functions (MCU) as well as a digital access arrangement chipset configured for connecting with a PSTN along with supporting line and device side circuitry (DAA). The Call Screening Device 1000 is configured to be connected to a telephone extension inside of a user's home, in parallel with other handsets, as soon in FIG. 3.

Stored within the MCU is a primary and secondary call screening process. Upon the arrival of an incoming call, the MCU evaluates the primary call screening process to determine whether to pick up the line or allow it to ring through. If the primary call screening process evaluates as true, the MCU picks up the line via the DAA and executes the secondary call screening process upon the caller. If the secondary call screening process evaluates as true, then the MCU executes the Ring Back Command upon the phone line and allows the line to ring until the user picks up the call. If the secondary call screening process evaluates as false, then the MCU hangs up the line, optionally playing a warning message to the caller before they are disconnected or offering that the caller record a voice message for the user.

According to certain embodiments of the present disclosure, the primary screening process may include matching a portion the caller ID data for an incoming call to an absolute blacklist of numbers which must always be screened, matching all or a portion of the caller ID data about the caller to a relative blacklist based on a condition such as times of day when calls should be screened, or a remotely stored blacklist disposed upon an internet server accessible to the MCU. In those embodiments of the present disclosure which rely on the decoding of caller ID data, the MCU utilizes DSP functions onboard the MCU or off-board on a discrete chip to decode the FSK encoded caller identification data.

According to certain embodiments of the present disclosure, the secondary screening process may include playing audio to the caller on the line asking that the caller enter a number which may be random or predetermined via dual tone multifrequency signaling (DTMF), playing a recording to the caller and asking for an input via voice, playing a recording to the caller notifying the caller of the called party's policy regarding solicitations, executing a Turing test including for instance messaging which is intended to only be understood by a machine caller, or executing a reverse Turing test including for instance messaging which is intended to be only understood by a human caller.

A method of using the present invention will now be described. Initially, a Call Screening Device 1000 is connected to any of the PSTN extensions within a home, with at least one telephone handset connected in parallel to the Call Screening Device 1000 via another extension within the home. Upon receiving an incoming call from a first caller at the home, the MCU within the Call Screening Device 1000 compares the caller ID data for the first caller to a blacklist of origin phone numbers. In this example, the caller ID for the first caller is not on the blacklist. Consequently, the Call Screening Device 1000 takes no action and allows the call to ring through.

Next, an incoming call from a second caller arrives at the home. The MCU compares the caller ID data for the second caller to the locally stored blacklist and finds a match. The device picks up the call, thereby preventing the other extensions within the home from ringing. The device selects a random number, in this case "52" and plays the following audio message to the second caller, "You have been identified as a potential robocaller. To verify that you are not a robocaller, please enter the number 52." The device then listens for DTMF tones corresponding to the caller having entered "52" on their handset. In this example, no numbers were successfully entered and the call is disconnected.

In the final example case, an incoming call from a third caller arrives at the home. The MCU compares the caller ID data for the third caller to the locally stored blacklist and finds a match. The device picks up the call, thereby preventing the other extensions within the home from ringing. The device selects a random number, in this case "76" and plays the following audio message to the second caller, "You have been identified as a potential robocaller. To verify that you are not a robocaller, please enter the number 76." The device then listens for DTMF tones corresponding to the caller having entered "76" on their handset. Upon hearing the correct tones for the number "76", the device plays the following message, "thank you for your entry, please wait while your call is connected."

The device then issues a Ring Back Command to the line, thereby causing all of the extensions in the home to ring and be connected to the third caller once one of the extensions is picked up.

Although certain embodiments of the present disclosure were described above with reference to specific structures and procedures, these are intended as exemplary rather than limiting ways of implementing the claims listed below.

What is claimed is:

1. A call screening device for telephone systems having at least two parallel wired telephonic outlets, the screening device comprising; a telephone line input wired to a first telephonic outlet wired in parallel with at least one other telephonic outlet and call handling electronics and a screening criteria stored within the electronics, wherein upon receiving an incoming call via the line input, the call screening device picks up the line to answer the call, executes the screening criteria upon the call; if the criteria returns a "pass", the electronics issue a hook flash command upon the telephone line and then hangs up the line, thereby causing the line and devices connected to parallel outlets to ring again.

2. The call screening device of claim 1, wherein the screening criteria is a reverse Turing test.

3. The call screening device of claim 2, wherein the screening criteria selects a random number that is read to the caller which the caller must then correctly enter as DTMF tones.

4. The call screening device of claim 2, wherein the screening criteria is a question which is irrelevant but effortless to answer for a human caller, including for instance, "what year is it?", "what vegetables are in a tomato soup?", "how many arms does a person have?" or other reverse Turing test known in the computational arts.

5. The screening device of claim 1, wherein after a "fail" result, the caller is played a recorded message before the device hangs up the line.

6. The screening device of claim 1, wherein after a "fail" result, the caller is given the option of recording a message for the called party before the device hangs up the line.

7. The screening device of claim 1, wherein after a "fail" result, the electronics hangs up the line, thereby disconnecting the call.

8. The screening device of claim 1, wherein the screening criteria is a blocklist.

9. A call screening method for telephone systems implemented on an electronic device, with the method comprising; providing first telephone line input wired in parallel with at least one other telephone line, providing call handling electronics wired to the telephone line, and providing a screening criteria stored within the electronics, wherein upon receiving an incoming call via the telephone line, the call screening electronics picks up the line to answer the call, executes the screening criteria upon the call; if the criteria returns a "pass", the electronics issue a hook flash command to the telephone line and then hangs up the line, thereby causing the line and all parallel lines connected to it to ring again.

10. The call screening method of claim 9, wherein the screening criteria is a reverse Turing test.

11. The call screening method of claim 9, wherein the screening criteria selects a random number that is read to the caller which the caller must then correctly enter as DTMF tones.

12. The call screening method of claim 9, wherein the screening criteria is a question which is irrelevant but effortless to answer for a human caller, including for instance, "what year is it?", "what vegetables are in a tomato soup?", "how many arms does a person have?" or other reverse Turing test known in the computational arts.

13. The screening method of claim 9, wherein after a "fail" result, the caller is played a recorded message before the device hangs up the line.

14. The screening method of claim 9, wherein after a "fail" result, the caller is given the option of recording a message for the called party before the device hangs up the line.

15. The screening method of claim 9, wherein after a "fail" result, the electronics hangs up the line, thereby disconnecting the call.

16. The screening method of claim 9, wherein the screening criteria is a blocklist.

* * * * *